Oct. 9, 1962 J. A. WEAVER 3,057,339
SMOKE GENERATOR
Filed Sept. 29, 1959 4 Sheets-Sheet 3
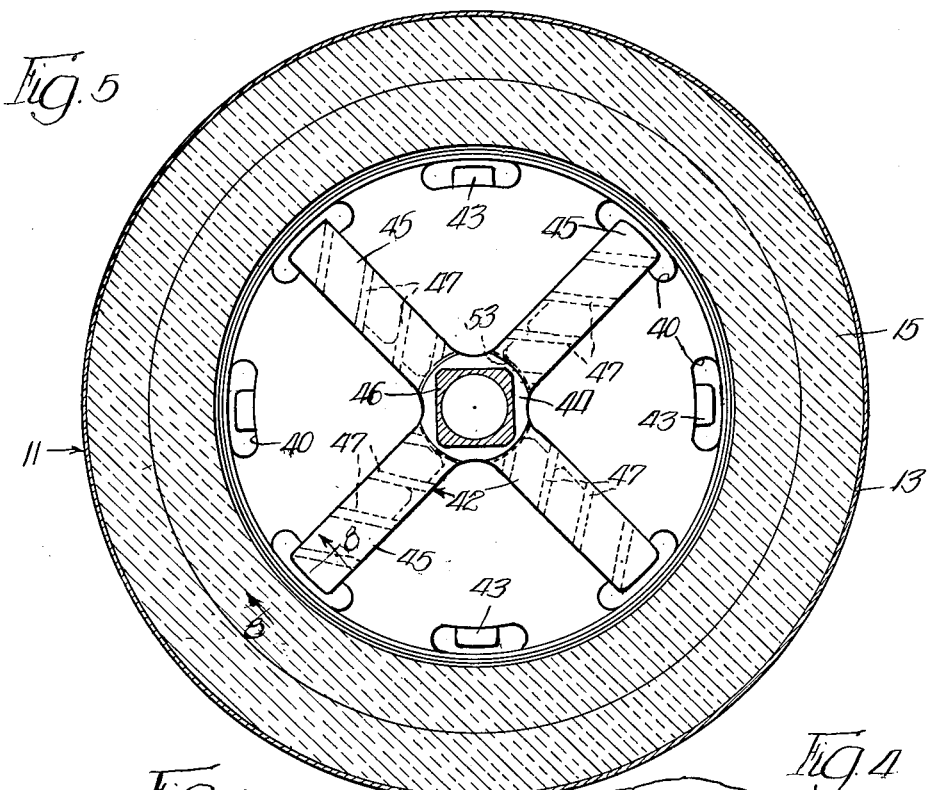
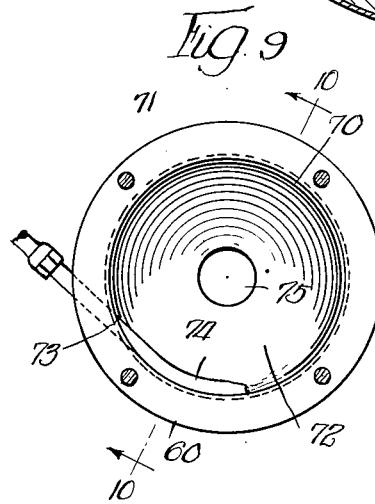
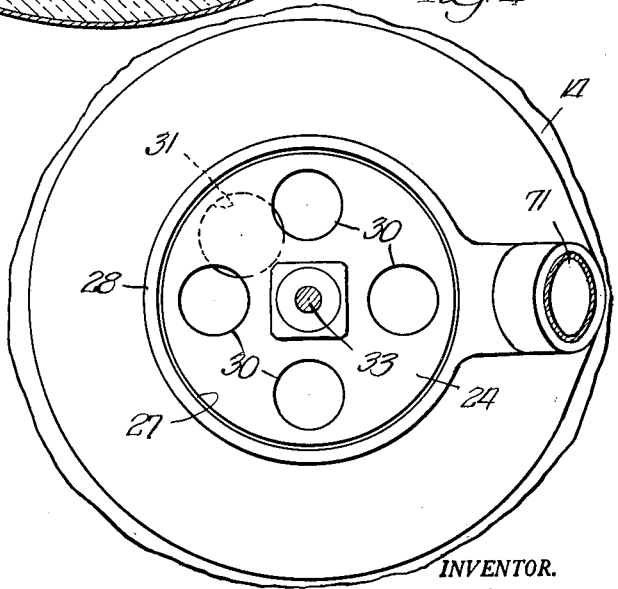
INVENTOR.
John A. Weaver,
BY
Cromwell, Greist & Warden
Attys.

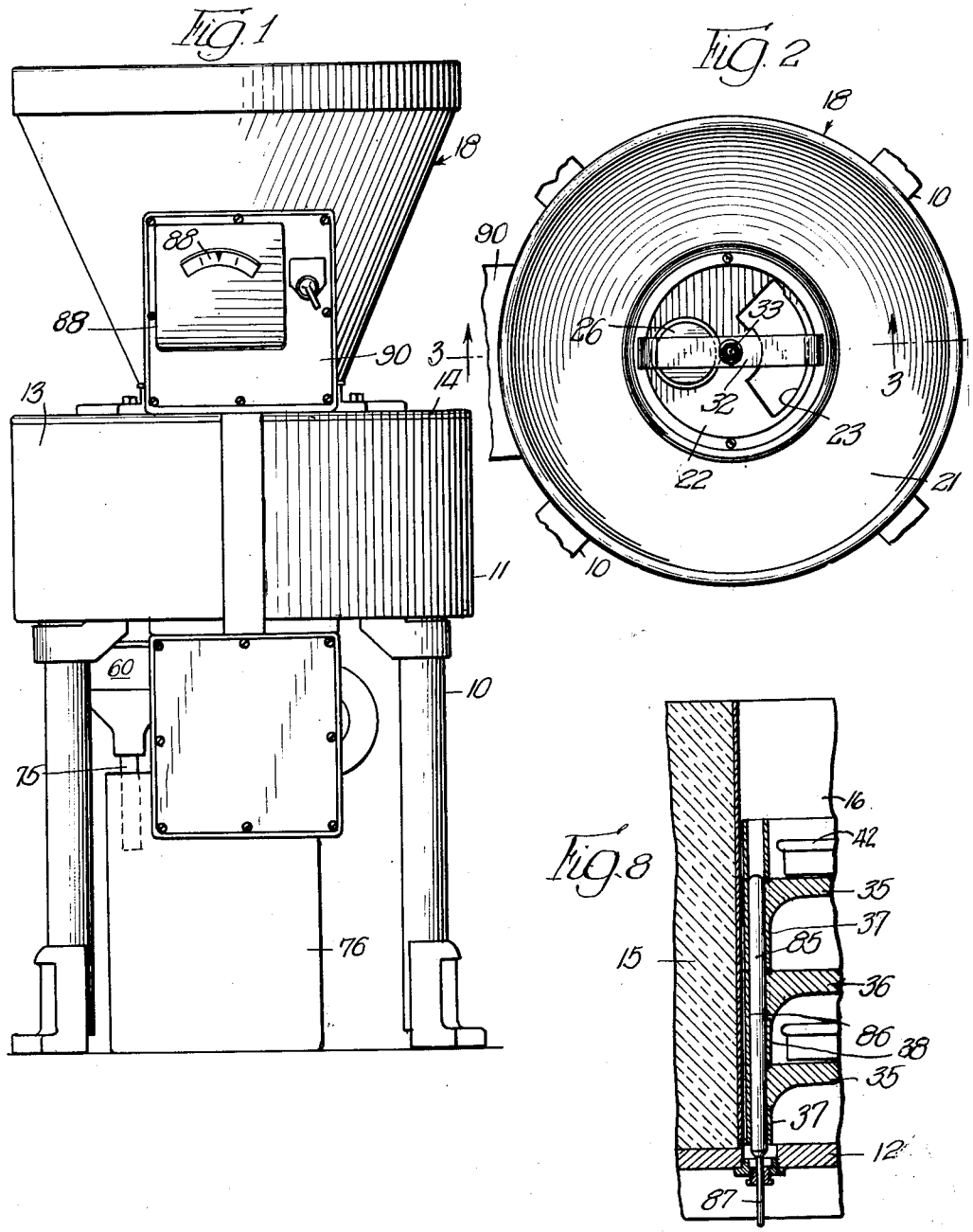

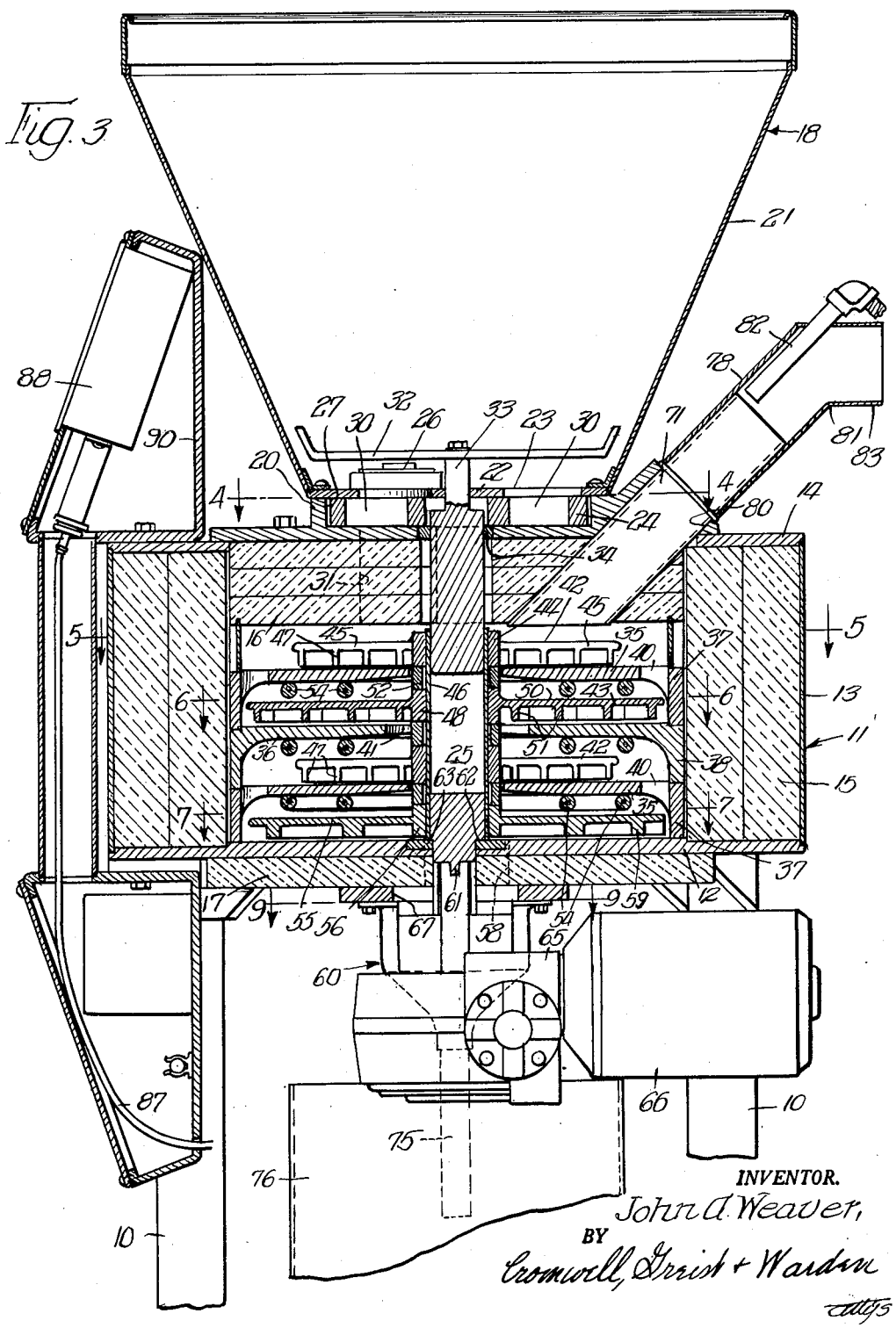

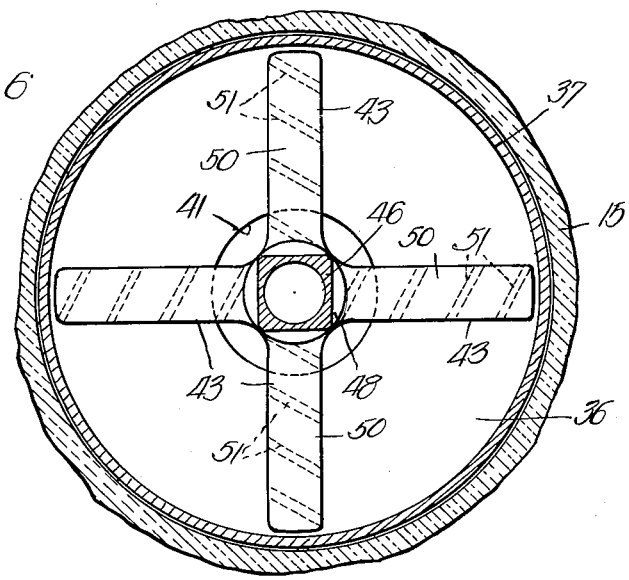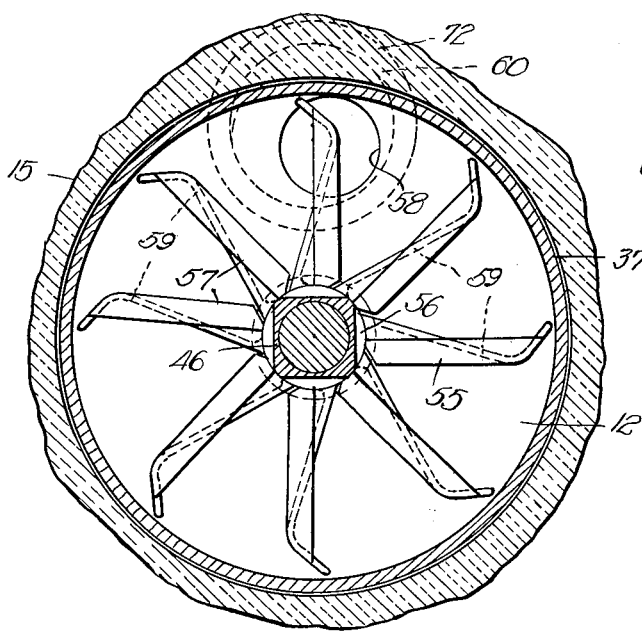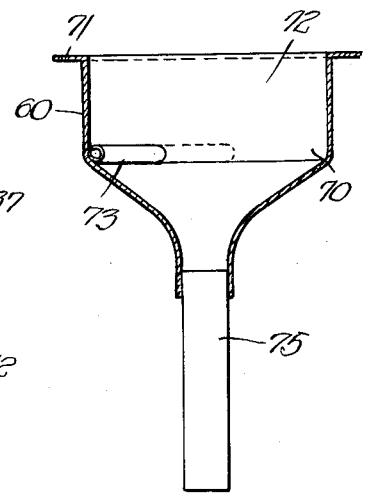

United States Patent Office 3,057,339
Patented Oct. 9, 1962

3,057,339
SMOKE GENERATOR
John A. Weaver, Madison, Wis., assignor to Oscar Mayer
& Co., Inc., Chicago, Ill., a corporation of Illinois
Filed Sept. 29, 1959, Ser. No. 843,176
13 Claims. (Cl. 126—59.5)

This invention relates to apparatus for use in connection with the curing of meats or other foods or substances and is more particularly concerned with improvement in apparatus for subqecting wood to destructive distillation and releasing therefrom the smoke required for the curing operation.

It is a general object of the invention to provide an improved apparatus for producing smoke from wood sawdust wherein the conditions under which the sawdust is treated or distilled may be controlled so as to provide for more efficient and economical production of the smoke.

It is a more specific object of the invention to provide an apparatus for producing smoke by the destructive distallation of finely divided wood sawdust wherein the distillation is accomplished in a closed chamber with provision being made for preventing the entrance of air and for controlling the amount and degree of heat and the feed of the sawdust through the chamber thereby to provide the most effective operating conditions.

It is a still more specific object of the invention to provide a smoke generator wherein wood sawdust is subject to destructive distillation within an oven which is effectively closed against the entrance of air and wherein the sawdust is progressively moved over a series of spaced, heated plates, with the rate of movement of the sawdust and the temperature of the plates being under the control of the operator.

It is another object of the invention to provide a smoke generator comprising a vertically disposed, cylindrical oven which is provided at its upper end with a hopper for supplying the sawdust to a series of vertically spaced, electrically heated plates having means for moving the sawdust progressively across the heated surface thereof, and a discharge or disposal unit in the bottom of the oven which is so constructed and operated that the charred residue is discharged through an opening which is effectively sealed against the entrance of air.

It is a still further object of the invention to provide a smoke generator which comprises a vertically disposed cylindrical oven having a series of vertically spaced, electrically heated plates therein over which the sawdust is progressively moved by plow members which are rotatably mounted on a vertically disposed drive shaft, a sawdust hopper at the top of the oven which has a rotatable feed plate mounted on the upper end of the drive shaft and a disposal unit at the bottom of the oven with means for wetting, cooling and discharging the charred residue delivered thereto, the sawdust hopper and its associated feed plate and the disposal unit being so constructed as to effectively seal the top and bottom of the oven against the entrance of air.

It is another object of the invention to provide a smoke generator in which finely divided sawdust is subjected to destructive distillation in a vertically disposed oven and the smoke resulting from the disti'lat'on of the sawdust is removed from a top portion of the oven through a smoke tube having provision therein for maintaining the temperature of the smoke and for preventing condensation of creosote.

These and other objects and advantages of the invention will be apparent from a consideration of the apparatus which is shown by way of illustration in the accompanying drawings wherein:

FIGURE 1 is a front elevation of a smoke generator having incorporated therein the principal features of the invention;

FIGURE 2 is a top plan view of the smoke generator;

FIGURE 3 is a vertical section taken on the line 3—3 of FIGURE 2, to an enlarged scale;

FIGURE 4 is a partial horizontal section taken on the line 4—4 of FIGURE 3;

FIGURE 5 is a partial horizontal section taken on the line 5—5 of FIGURE 3;

FIGURE 6 is a horizontal section taken on the line 6—6 of FIGURE 3;

FIGURE 7 is a partial horizontal section taken on the line 7—7 of FIGURE 3;

FIGURE 8 is a fragmentary vertical section, to an enlarged scale, taken on the line 8—8 of FIGURE 5;

FIGURE 9 is a horizontal section, to an enlarged scale, taken on the line 9—9 of FIGURE 3; and FIGURE 10 is a vertical section taken on the line 10—10 of FIGURE 9.

Referring to the drawings, there is illustrated a smoke generator which embodies the principal features of the invention and which is designed to be used in supplying smoke to a smokehouse for the processing of meats or similar substances. The illustrated apparatus comprises an upright supporting frame shtructure or base 10 which is in the form of a table and which supports a vertically disposed cylindrical oven 11 having its bottom end closed by the plate-like member 12, the latter forming the top of the supporting frame 10.

The cylindrical oven 11 has a side wall in the form of a tubular section or shell 13 and a plate-like top member 14. The shell 13 of the oven 11 is lined with a double thickness of heat insulating material 15 which may be "Thermobestos," a product of Johns Manville Corporation or any other non-heat transferring material of a similar character. The top cover plate member 14 is insulated on its interior by a triple thickness of suitable insulating sheet material 16 which may be of the same character as the side wall insulation 15. The bottom plate 12 of the oven 11 is insulated on its bottom surface against the transfer of heat by a sheet of suitable heat insulating material 17 which may be of the same type as the insulating material 15 and 16.

A sawdust supply bin 18 is supported on the upper side of the oven 11, on an upstanding cylindrical flange 20 on the top plate 14. The sawdust supply bin comprises a receptacle section or side wall 21 which is in the form of a truncated cone with the larger opening at the top and the smaller opening thereof at the bottom, the latter being closed by a bottom forming circular plate 22. The bottom plate 22 of the bin 18 is provided with an elongate feeding aperture 23 (FIGURE 2) through which sawdust is delivered to a rotating circular feed plate 24 which is mounted on the upper end of a vertically disposed drive shaft 25. The bottom plate 22 of the bin 18 is provided with a cleanout plug 26 providing access to the recess 27 which is formed by the upstanding circular flange 20 on the top of the plate 14 on which the bin 18 is supported. The feed plate 24 has a thickness corresponding to the depth of the recess 27 so that its top and bottom faces engage the bottom face of the plate 22 and the top face of the plate 14, respectively. The rotating feed plate 24 has four cylindrical feed or charge measuring pockets 30 which are spaced equidistant radially and circumferentially so as to pass beneath the aperture 23 in the plate 22 to receive a charge of the sawdust through the aperture 23 and to carry the same around to the other side of the oven where the charge of sawdust is discharged through a vertically extending opening or passageway 31, the latter extending through the plate member 14 and the top insulation 16 so as to discharge the sawdust into the top of the distillation chamber formed by the cylindrical oven 11. A sawdust agitator bar 32 is secured on a reduced upper end portion 33 of the drive shaft 25 which projects upwardly through a central aperture in the bottom plate 22 of the supply hopper 18 so that the agitator is rotated with the feed plate 24. The upper end portion of the vertical shaft 25 is rotatably mounted in a bearing sleeve 34 which extends through an aperture in the cover plate 14.

The oven 11 is provided with three horizontally disposed, vertically spaced shelf-forming plate members 35, 36 and 35 (FIGURES 3, 5 and 6) the upper and lower members 35 being identical. The plate members are provided with peripheral flanges 37 and 38 which are in the form of tubular sections of the same diameter so that when the plates are arranged in vertically disposed relation, they are supported by the flanges 37 and 38 one above the other. Each of the plates 35 is provided around its periphery with a series of circumferentially spaced apertures or passageways 40 which permit the sawdust to be moved from the upper surface of the plate down to the next heating plate or treating zone immediately below the same. The apertures 40 are located immediately inside the flanges 37 and the sawdust is moved across the surface of the plate to the same by plow members which will be described. The center plate 36 is provided with an enlarged center aperture 41 which provides a passageway for the sawdust to progress from the plate 36 to the plate 35 below the same. Each of the plates 35, 36 and 35 has associated with it a spider-like sawdust advancing plow 42, 43 and 42. The plows 42, which are associated with the plates 35, are identical in construction and each one has an inner hub member 44 with four outwardly directed arms 45. The hub 44 is apertured to fit over a supporting sleeve 46 which is fixed on the shaft 25 and rotates with the latter. Each of the arms 45 has a series of spaced flange sections 47 which are arranged in depending planes at angles of approximately 60° with the long axis of the arm 45, which axis coincides with a radius of the circle of rotation of the plow 42. The center plow 43 has a similar hub formation 48 also apertured to fit over the sleeve 46 of the shaft 25 and a series of four radially extending arms 50 having flange-like members 51 depending in planes at angles of approximately 60° relative to the radii constituting the long axis of each arm 50. The plows 42 and 43 are mounted on the shaft 25 with the hubs being separated by spacer members 52 and the latter extending through the center aperture 41 in the middle plate 36 and the apertures 53 provided in the top and bottom plates 35, the latter being of sufficient diameter to permit the shaft 25 to rotate without interference from the fixed plates 35 and 36. The plow members or sweeper arms 42 are arranged so that upon rotation of the shaft 25 the sawdust on each plate 35 is moved in a spiral-like path outwardly of the center of the plate towards the discharge passageways at the outer periphery thereof. The middle sweeper arm 43 is arranged so that upon rotation of the shaft 25 the sawdust on the top surface of the plate 36 is moved inwardly and discharged through the center opening 41 to the plate 35 below the same. All of the plates 35 and 36 are provided with individual electric heaters as indicated at 54.

A plow member 55 is arranged at the bottom of the oven 11 with a hub portion 56 mounted on the sleeve 46 for rotation with the shaft 25 and with a series of radially extending arms 57 having depending flange formations 59 which are formed so as to move the charred residue to which the sawdust has been reduced, in a path to bring the same to a discharge opening or passageway 58 in the bottom plate 12 through which the residue is delivered to a disposal unit 60 secured on the bottom of the oven against the lower face of the heat insulating plate 17.

The shaft 25 has a bottom end portion 61 of reduced diameter so as to provide a shoulder 62 which rests on a bottom bearing plate 63 and the end portion has a separable connection with the output shaft 64 of a change speed device 65 which is in turn operably connected to the drive motor 66, the latter being supported on suitable brackets on the frame 10 at the base of the machine.

The disposal unit 60 is constructed so as to form an airtight seal over the discharge passageway 58 at the bottom of the oven 11 and also to dispose of the residue which is delivered through the passageway. The disposal unit 60 comprises a cone-like body member 70 having a top plate 71. The top plate 71 has a center aperture 72 and the unit is located so that the charred residue moving through the passageway 58 falls into the compartment formed by the cone 70. Water is supplied to the inner surface of the cone 70 through a pipe or conduit 73 which enters the cone 70 near the top thereof and has its end section 74 curved to correspond to the inner curvature of the cone 70 so that water discharged through the same will travel a spiral path downwardly towards the apex of the cone and run off into the discharge pipe 75 carrying with it the residue which is delivered through the passageway 58. A suitable collection receptacle or container 76 may be provided to receive the mixture of water and residue from the discharge pipe 75.

The gaseous products of distillation or the smoke rises in the oven 11 and is carried off through a discharge conduit or stack 78, the lower end of which extends through an upwardly and outwardly inclined opening 80 in the top plate 14 and the insulation 16. The stack 78 is angled at 81 and provided with an electric heater 82 which is mounted to extend into the bottom portion of the stack 78 which slants towards the oven 11. The angled section 83 of the stack slants away from the top of the oven 11 so that any condensation, due to cooling of the smoke after it passes the heater 82, will not run back into the oven 11. The heater 82 insures that the smoke is maintained at a temperature sufficient to prevent condensation and consequent discharge of creosote back into the oven.

In order to effect proper control of the temperature in the oven 11, a temperature control bulb 85 is mounted in a recess 86 provided in the wall formed by the flanges 37 and 38 on the heated plates 35 and 36. The temperature control bulb 85 is connected by a suitable conduit 87 to a gauge 88 which is housed in a control box 90 on the one side of the machine.

The time during which the sawdust is subjected to the heat is controlled by the speed of rotation of the shaft 25 which, through the plows 42 and 43, controls the movement of the sawdust progressively through the oven 11.

In operating the machine the bin 18 is provided with a supply of sawdust and the plates 35 and 36 are heated by the electrical heaters 54 to the temperature required for operation. The shaft 25 is then rotated to start the feed of the sawdust from the bin 18 to the uppermost plate 35. As the sawdust progresses through the machine the necessary adjustment of speed and temperature may be made to insure proper distillation of the sawdust. The disposed unit for the charred residue is, of course, placed in operation by turning on the water in the supply conduit 73, sufficient water being fed into the cone to insure that the opening at the bottom of the same remains closed regardless of whether there is any of the charred residue being discharged or not.

While particular materials and specific details of construction have been referred to in describing the form of the machine illustrated, it will be understood that other materials and equivalent details of construction may be resorted to within the spirit of the invention.

I claim:

1. An apparatus for producing smoke by the destructive distillation of finely divided wood sawdust comprising a vertically disposed cylindrical oven having a closed top and imperforate side walls, means communicating with the oven for delivering sawdust into the closed top of said oven, a series of horizontally disposed electrically heated plate members fixed in vertically spaced relation in said oven, a vertically disposed rotatably mounted drive shaft extending through said oven and sealed at the end walls thereof, a plow member mounted on said shaft above each of said heated plate members which plow member is constructed to advance the sawdust across the top surface of its associated plate member, said plate members having apertures forming vertical passageways through which the sawdust is moved upon rotation of said plow members, a closure member on the bottom of said oven having a passageway for discharging the charred residue therethrough and a disposal unit mounted on the bottom of said oven so as to cover said passageway and receive the charred residue therefrom, said disposal unit having seal forming means for discharging the charred residue without permitting air to enter said disposal unit and a smoke discharge conduit connected with the top of said oven for discharging the smoke therefrom.

2. An apparatus for producing smoke by the destructice distillation of finely divided wood sawdust comprising a vertically disposed cylindrical oven having a sawdust supply hopper on the top thereof, means for delivering sawdust from the hopper into the top of said oven, a series of horizontally disposed, electrically heated plate members fixed in vertically spaced relation in said oven, a vertically disposed rotatably mounted drive shaft extending upwardly into said oven, a plow member mounted on said shaft above each of said heated plate members which plow member comprises radially extending arms having depending flange formations spaced outwardly relative to the axis of rotation of said shaft for moving the sawdust across the top surface of its associated plate member, said plate members having apertures forming vertical passageways through which the sawdust is advanced downwardly from one plate to the next upon rotation of said plow members, a closure member on the bottom of said oven having a passageway for discharging charred residue therethrough and a disposal unit mounted on the bottom of said oven so as to cover said passageway and receive the charred residue therethrough, said disposal unit having a seal forming fluid means for discharging the charred residue without permitting air to enter said disposal unit and a smoke discharge conduit communicating with the top of said oven for discharging the smoke therefrom.

3. A smoke generator comprising a cylindrical oven arranged with its major axis disposed vertically, said oven being constructed to form a closed chamber a plurality of vertically spaced, horizontally disposed, electrically heated plates mounted in said oven and having apertures therein providing vertical passageways for sawdust, means for moving the sawdust progressively across successive plates from the top to the bottom of said oven, a sawdust supply hopper on the top of said oven, means to seal the top of the oven against the entrance of air while delivering successive charges of sawdust from the hopper onto the topmost plate in said oven, a closure member on the bottom of said oven having a passageway for receiving the charred residue to which the sawdust is reduced from the oven, a discharge unit comprising means forming a closed chamber at the bottom end of said passageway with a bottom opening therein, means for delivering a liquid into an upper portion of the chamber in a quantity sufficient to fill said bottom opening as it flows downwardly through the same and carries the charred residue out of the unit, and a smoke discharging conduit connected to the top of said oven.

4. A smoke generator comprising a cylindrical oven arranged with its major axis disposed vertically, a plurality of vertically spaced, horizontally disposed, electrically heated plates mounted on said oven and having apertures therein providing vertical passageways for sawdust, means for delivering charges of sawdust to the uppermost plate, means for moving the sawdust progressively across successive plates from the top to the bottom of said oven and discharging the same through the apertures in said plates, a closure member on the bottom of said oven having a passageway for receiving the charred residue to which the sawdust is reduced, a discharge unit on the bottom of said oven comprising means forming a closed chamber at the bottom end of said passageway with a bottom opening therein, means for delivering a liquid into an upper portion of the chamber in a quantity sufficient to fill said bottom opening as it flows downwardly through the same and carries the charred residue out of the unit, and a smoke discharging conduit connected to the top of said oven.

5. A smoke generator as recited in claim 4 and an electric heater in said smoke discharging conduit with control means therefor for maintaining the temperature of the smoke at a height sufficient to prevent condensation of creosote.

6. A smoke generator comprising an upright cylindrical oven, a plurality of vertically spaced, horizontally disposed, electrically heated plates mounted in said oven and having apertures therein providing vertical passageways for sawdust, means for delivering charges of sawdust to the uppermost plate, rotating plow means for moving the sawdust progressively across successive plates and discharging the same through the apertures in said plates so that it travels from the top to the bottom of the oven, said oven having a passageway at the bottom thereof for discharging the charred residue remaining from the burning of the sawdust, a disposal unit on the bottom of said oven comprising means forming a closed chamber at the bottom end of said passageway with a bottom opening therein, means for delivering a liquid into said chamber in a quantity sufficient to fill said bottom opening as it flows downwardly through the same and carries the charred residue out of the unit, and a smoke receiving means connected to said oven.

7. A smoke generator as recited in claim 6 and an electric heater in said smoke receiving means with control means therefor for maintaining the temperature of the smoke at a height sufficient to prevent condensation of creosote.

8. An apparatus for producing smoke by the destructive distillation of finely divided wood sawdust comprising a vertically disposed cylindrical oven having a closed top, means communicating with the oven for delivering sawdust into the closed top of said oven, a series of vertically spaced, horizontally disposed electrically heated plate members fixed in said oven, a vertically disposed rotatably mounted drive shaft extending through said oven, a plow member mounted on said shaft above each of said heated plate members which plow member is constructed to advance the sawdust across the top surface of its associated plate member, said plate members having apertures forming vertical passageways through which the sawdust is moved upon rotation of said plow members, said oven having a passageway at the bottom thereof for discharging the charred residue to which the sawdust is reduced and a disposel unit mounted on the bottom of said oven so as to cover said passageway, said disposal unit having means for delivering water therein for travel in a spiral path through a bottom opening whereby to seal the opening against the passage of air and discharge the charred residue without permitting air to enter said disposal unit and a smoke conduit connected to said oven for conducting the smoke therefrom.

9. An apparatus for producing smoke by the destructive distillation of finely divided wood sawdust comprising a vertically disposed cylindrical oven having a sawdust supply hopper closing the top thereof, a rotatably mounted feed plate in the bottom of said hopper for delivering sawdust from the hopper into the top of said oven, a series of horizontally disposed, electrically heated plate members fixed in vertically spaced relation in said oven, a vertically disposed rotatably mounted drive shaft extending upwardly through said oven, said sawdust feed plate being mounted on said shaft, a plow member mounted on said shaft above each of said heated plate members, said plow members comprising radially extending arms having depending flange formations spaced outwardly relative to the axis of rotation of said shaft and angled to move the sawdust across the top surfaces of the associated plate members, said plate members having apertures forming vertical passageways through which the sawdust is advanced downwardly from one plate to the next upon rotation of said plow members, said oven having a passageway for discharging the charred residue to which the sawdust is reduced therethrough and a disposal device mounted on the bottom of said oven so as to cover said passageway, said disposal device having fluid means for carrying off the charred residue without permitting air to enter said oven and means to receive the smoke at the top of said oven.

10. A smoke generator comprising a cylindrical oven arranged with its major axis disposed vertically, a plurality of vertically spaced, horizontally disposed, electrically heated plates mounted in said oven and having apertures therein providing vertical passageways for sawdust, means for sealing the oven at the top and bottom ends, means communicating with said oven for delivering charges of sawdust to the upermost plate, means for moving the sawdust progressively across successive plates from the top to the bottom of said oven and discharging the same through the apertures in said plates, a device on the bottom of said oven for disposing of the charred residue to which the sawdust is reduced without admitting air to said oven, a smoke discharging conduit connected to the top of said oven, and an electric heater in said smoke discharging conduit with control means for maintaining the smoke at a range of temperature sufficient to prevent condensation of creosote without combustion of the smoke.

11. An apparatus for producing smoke by the destructive distillation of finely divided wood sawdust comprising a closed vertically disposed cylindrical oven having a sawdust supply hopper on the top thereof, a passageway communicating with the oven and means for delivering successive charges of sawdust from the hopper through the passageway and into the top of said oven, a series of horizontally disposed, electrically heated plate members fixed in vertically spaced relation in said oven, a vertically disposed rotatably mounted drive shaft extending upwardly through said oven with its upper end terminating in said hopper, and agitator blade mounted on the terminal upper end of said drive shaft, plow members mounted on said shaft above each of said heated plate members and having scraper blades engaging the top surface of said heated plate members, which scraper blades are arranged relative to the axis of rotation of said shaft for moving the sawdust across the top surfaces of said plate members, said plate members having apertures forming vertical passageways through which the sawdust is advanced downwardly from one plate to the next upon rotation of said plow members, a device on the bottom of said oven having a fluid sealed passageway for discharging therethrough the residue to which the sawdust is reduced without allowing air to enter the oven, a smoke receiving conduit having an angular lower end portion connected in upwardly extending relation with the top of said oven for discharging the smoke therefrom, and means at the upper end of the lower angular portion of said conduit to heat the smoke so as to maintain a temperature sufficient to prevent condensation of creosote without burning of the smoke.

12. A method of producing smoke by the destructive distillation of finely divided wood sawdust which comprises feeding the sawdust into an enclosed chamber which is provided with a bottom passageway having a combination seal and quenching means through which the residue may pass, moving the sawdust over a series of vertically spaced horizontal support members which are heated to a temperature sufficient to distill the sawdust, withdrawing the smoke from the top of the chamber through a discharge passageway and heating the smoke as it moves through the discharge passageway adjacent said chamber so as to maintain it at a temperature sufficient to prevent condensation of cresosote, and removing the residue from the chamber through the bottom passageway thereby quenching the residue while discharging the same from the bottom of the chamber.

13. In an apparatus for producing smoke by the destructive distillation of finely divided wood sawdust, a vertically disposed oven having means for delivering sawdust into the closed top thereof, a plurality of electrically heated plates mounted in said oven in longitudinally disposed, vertically spaced relation, means forming vertical passageways between the plates, means for moving the sawdust progressively across successive plates and through the passageways from the top to the bottom of the oven, means for discharging from the bottom of the oven the residue to which the sawdust is reduced, a smoke discharge conduit having an upwardly extending portion at the top of said oven for discharging the smoke upwardly therefrom, a heating means in said conduit adjacent the top of said oven and means to control said heating means so as to maintain the smoke at a temperature sufficient to avoid condensation of creosote as the smoke is discharged from the oven without combustion of the smoke.

References Cited in the file of this patent

UNITED STATES PATENTS

| | | |
|---|---|---|
| 1,207,019 | Glover et al. | Dec. 5, 1916 |
| 1,773,870 | Schmidt | Aug. 26, 1930 |
| 1,811,191 | Taylor | June 23, 1931 |
| 1,926,455 | Ramage | Sept. 12, 1933 |
| 1,928,822 | Schmidt | Oct. 3, 1933 |
| 2,000,171 | Gronningseeter | May 7, 1935 |
| 2,116,725 | Jenness | May 10, 1938 |
| 2,116,976 | Koeppl | May 10, 1938 |
| 2,729,735 | Fries | Jan. 3, 1956 |
| 2,743,529 | Hayes | May 1, 1956 |
| 2,783,723 | Loewenthal et al. | Mar. 5, 1957 |
| 2,832,278 | Toranik | Apr. 29, 1958 |
| 2,843,106 | Tipper | July 15, 1958 |